United States Patent [19]

Asano

[11] 3,938,165

[45] Feb. 10, 1976

[54] PHOTOGRAPHIC CAMERA WITH AUTOMATIC EXPOSURE CONTROL MEANS

[75] Inventor: Seizi Asano, Okegawa, Japan

[73] Assignee: Fuji Photo Optical Co., Ltd., Omiya, Japan

[22] Filed: June 24, 1975

[21] Appl. No.: 589,846

[30] Foreign Application Priority Data
July 23, 1974   Japan.......................... 49-87510[U]

[52] U.S. Cl. .................. 354/50; 354/234; 354/237; 354/268
[51] Int. Cl.² ...................... G03B 7/08; G03B 17/38
[58] Field of Search ........................... 354/267–268, 354/50–51, 60 R, 237–239, 234, 258

[56] References Cited
UNITED STATES PATENTS

| | | | |
|---|---|---|---|
| 3,504,604 | 4/1970 | Kitai | 354/51 |
| 3,875,580 | 4/1975 | Watanabe et al. | 354/268 |

Primary Examiner—L. T. Hix
Assistant Examiner—James LaBarre

[57] ABSTRACT

A photographic camera having an automatic exposure control means and a self-timer and provided with a shutter release locking means which is operated to lock the shutter release mechanism when the scene brightness is lower than a predetermined level is provided with a shutter locking means nullifying lever which nullifies the effect of the shutter release locking means when desired. Particularly, the nullifying lever is associated with the self-timer so that the self-timer is made operable only when the nullifying lever is in the nullifying position so that the shutter locking means may be nullified every time the self-timer is used. In one preferred embodiment, the nullifying lever is used as a self-timer start lever. In another embodiment, the nullifying lever is used to cover a self-timer start button when the lever is in the position to allow the shutter locking means to operate.

8 Claims, 10 Drawing Figures

PHOTOGRAPHIC CAMERA WITH AUTOMATIC EXPOSURE CONTROL MEANS

BACKGROUND OF THE INVENTION

This invention relates to a photographic camera provided with an automatic exposure control means, and more particularly to a photographic camera provided with an automatic exposure control means in which the shutter is locked automatically when the scene brightness is too low to obtain a picture of normal exposure with a normal shutter speed.

It has been known in the art to provide a shutter locking means which automatically locks the shutter mechanism so that the shutter will not be released when the controlled shutter speed is too slow because of too low scene brightness. Cameras of this kind are called fool-proof cameras and are very advantageous when used by unskilled persons.

The above described cameras provided with the shutter locking means, however, are disadvantageous in that the shutter cannot be released even when the camera is stably supported by a tripod to take a picture with a long exposure time or when it is the photographer's intention to take an under-exposed picture.

SUMMARY OF THE INVENTION

In view of the above described defects inherent in conventional cameras, it is the primary object of the present invention to provide a photographic camera provided with a shutter locking means in which the effect of the shutter locking means is nullified when required.

Another object of the present invention is to provide a photographic camera provided with a self-timer in addition to a shutter locking means automatically operated when the scene brightness is too low in which the effect of the shutter locking means is nullified when the self-timer is operated.

Still another object of the present invention is to provide a photographic camera provided with a self-timer in addition to a shutter locking means automatically operated when the scene brightness is too low in which the self-timer is made operable only when the effect of the shutter locking means is nullified.

A further object of the present invention is to provide a photographic camera provided with a self-timer which is normally charged in which a self-timer starting button is made accessible only when a lever to nullify the effect of a shutter locking means which is operated to lock the shutter when the scene brightness is too low is rotated.

The above objects are accomplished by providing in the camera a shutter locking means nullifying lever which is manually operable when desired. The shutter locking nullifying lever is associated with a self-timer mechanism so that the self-timer is made operable only when the nullifying lever is in the position to nullify the effect of the shutter locking means. More preferably, the nullifying lever is made to swing between a first position to prevent operation of the self-timer and a second position to allow the operation thereof, and the effect of the shutter locking means is nullified when the nullifying lever is in said second position.

In accordance with the present invention as summarized above, the effect of the shutter locking means which is automatically operated to lock the shutter when the scene brightness is under a predetermined level is nullified by a nullifying lever which is operated when a self-timer is used. In accordance with a preferred embodiment of the present invention in which a camera provided with a self-timer which is always charged is provided with a shutter locking means, a lever for nullifying the effect of the shutter locking means which is normally in a first position to prevent the access to the self-timer operating means is moved to a second position to make the self-timer operable only when the nullifying lever nullifies the effect of the shutter locking means, so that the self-timer cannot be accidentally operated.

DESCRIPTION OF THE PREFERRED EMBODIMENTS

Figure 1:
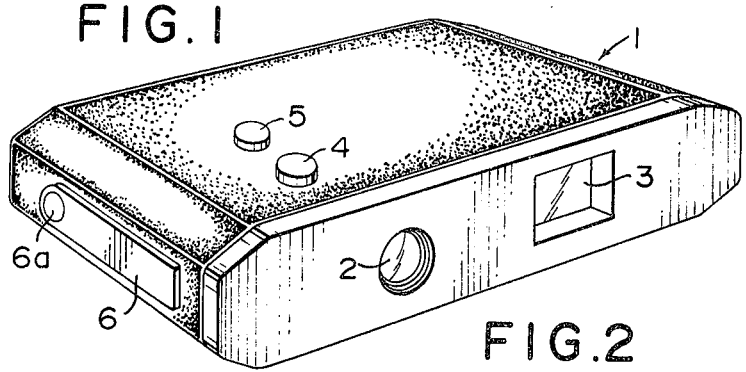
FIG. 1 is a perspective view of an embodiment of a camera in accordance with the present invention in which the shutter locking nullifying lever is in the normal position to make the shutter locking means operable.
Figure 2:
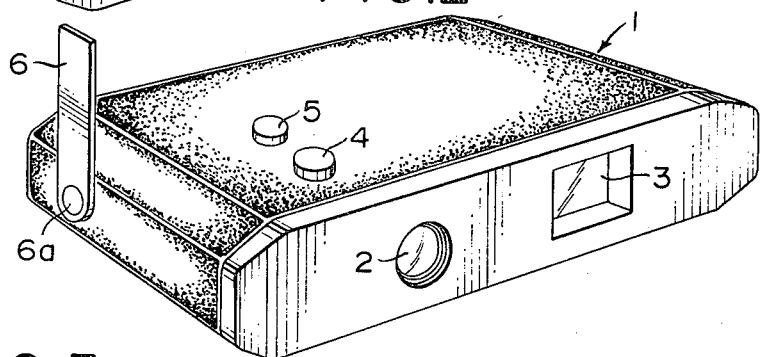
FIG. 2 is a perspective view of the camera as shown in FIG. 1 wherein the shutter nullifying lever is in the position to nullify the effect of the shutter locking means.
Figure 3:
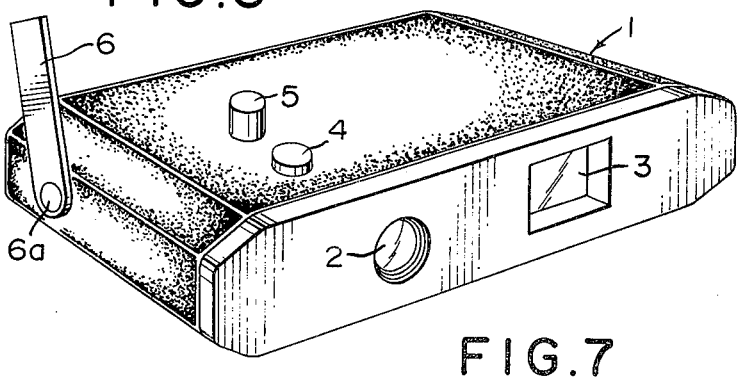
FIG. 3 is a perspective view of the camera as shown in FIG. 1 wherein the shutter nullifying lever is in the position to start a self-timer.

FIGS. 1 to 3 show an embodiment of a camera in accordance with the present invention in which the camera body 1 of a camera is provided on the front face thereof with a taking lens 2 and a view finder window 3 and on the upper face thereof with a shutter release button 4 and a self-timer charge button 5. The camera body 1 is further provided on the side face thereof with a shutter locking means nullifying lever 6 pivotally mounted to a pivot 6a. In this embodiment, the nullifying lever 6 is made swingable between three positions. In the first position thereof as shown in FIG. 1, the lever 6 allows a shutter locking means to operate. In the second position thereof as shown in FIG. 2, the lever 6 nullifies the effect of the shutter locking means. In the third position thereof as shown in FIG. 3, the lever 6 both starts a self-timer in the camera and nullifies the effect of the shutter locking means. The nullifying lever 6 should preferably be click-stopped at the three positions to ensure the three kinds of operation thereof. The self-timer charge lever 5 is in the charged position in FIGS. 1 and 2 and is in the released position in FIG. 3 as well known in the art. A self-timer (not shown) provided in the camera body 1 is charged by depressing the self-timer charge button 5. As the self-timer is released, the button 5 is projected upward on the upper face of the camera body 1 as shown in FIG. 3.

Figure 4:
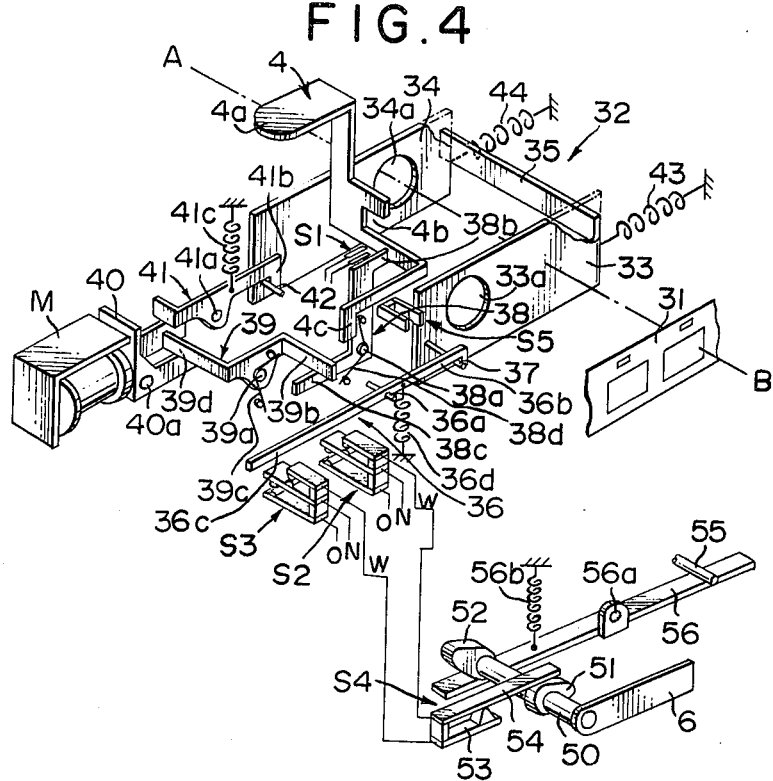
FIG. 4 is a perspective view showing the internal mechanism of the exposure control means connected with a shutter locking means and a shutter locking means nullifying lever in accordance with an embodiment of the invention.

Referring to FIG. 4 showing the internal mechanism of the camera in accordance with the present invention, a film 31 is located at a position to receive light through the taking lens 2 (not shown in FIG. 4) and a diaphragm (not shown) by way of the shutter mechanism 32 comprising a first shutter blade 33 and a second shutter blade 34. The optical axis of the light coming through the shutter mechanism is indicated by a chain line A–B. The pair of shutter blades 33 and 34 are provided with openings 33a and 34a, respectively, and movable in the direction perpendicular to the optical axis A–B to close and open the optical path of the light coming from the taking lens 2. The shutter mechanism 32 in FIG. 4 is shown in the charged state where the shutter charge is completed and the both shutter blades 33 and 34 are in the initial positions. In this state of the shutter mechanism 32, the opening 33a of the first shutter blade 33 is out of alignment with the optical axis A–B and the opening 34a of the second shutter blade 34 is in alignment with the optical axis A–B. The first shutter blade 33 is provided with a bent portion 35 extending at a right angle from the leading end thereof as shown in FIG. 4, which portion 35 is engaged with the leading end of the second shutter blade 34 to prevent the movement thereof.

Figure 5:
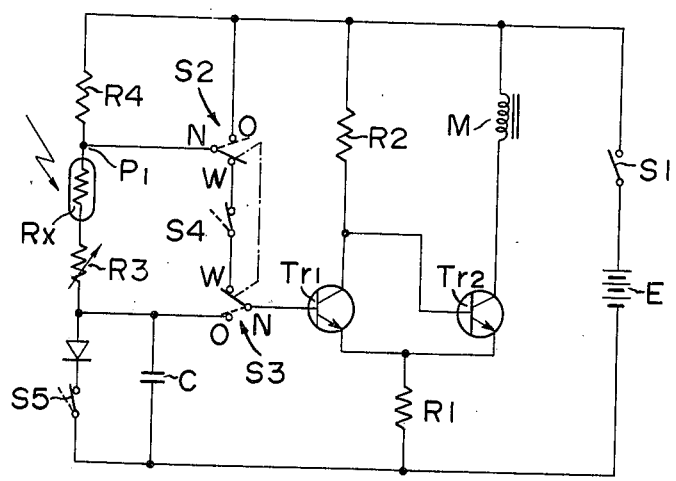
FIG. 5 is a circuit view showing the electric circuit employed in the embodiment of the present invention.

The first shutter blade 33 is provided with an engaging pin 37, which is engaged with a shutter blade holding lever 36. The shutter blade holding lever 36 is pivotally mounted to a pivot 36a. One hand 36b of the holding lever 36 has at the top end thereof an engaging portion to fall into engagement with said engaging pin 37 and the other hand 36c thereof extends over a pair of switches comprising a second switch S2 and a third switch S3 of an electric circuit employed in connection with the shutter mechanism 32 as shown in FIG. 5, so that the holding lever 36 may close the switches S2 and S3 when the holding lever 36 swings counterclockwise (in FIG. 4) to release the engaging pin 37.

The shutter blades 33 and 34 are spring-urged in the same direction by means of tension springs 43 and 44, respectively. When the first shutter blade 33 is moved by the spring 43, the opening 33a thereof is brought into alignment with the optical axis A–B. When the second shutter blade 34 is moved by the spring 44, the opening 34a thereof is brought out of alignment with the optical axis A–B.

A vertically movable shutter release member 4 is provided in the camera body. The shutter release member 4 comprises a button portion 4a to be depressed when the shutter is to be released, an engaging portion 4b to be engaged with a shutter release locking lever 38 which will hereinafter be described in detail, and a releasing portion 4c to fall in abutment with said hand 36c of the shutter blade holding lever 36. By the downward movement of the shutter release member 4, the left hand 36c of the shutter blade holding lever 36 is pushed down and the engaging portion at the top end of the right hand 36b of the lever 36 is disengaged from the pin 37 to release the first shutter blade 33. The lever 36 is spring urged clockwise by means of a tension spring 36d.

Said shutter release locking lever 38 is pivotally mounted to a pivot 38a and movable between an engaging position in which the top end 38b thereof is in engagement with said engaging portion 4b of the shutter release member 4 and a releasing position in which the top end 38b thereof is out of engagement with said engaging portion 4b. The shutter release locking lever 38 is L-shaped and the lower arm 38c thereof is engaged with an interlocking lever 39. The locking lever 38 is spring urged in the clockwise direction by a spring 38d and the clockwise movement thereof is blocked by the right arm 39b of said interlocking lever 39. The interlocking lever 39 is pivotally mounted to a pivot 39a and spring urged in the counterclockwise direction by a spring 39c. The left arm 39d of the interlocking lever 39 is engaged with a magnetically operable L-shaped lever 40 so that the counterclockwise movement of the L-shaped lever 40 causes the interlocking lever 39 to rotate clockwise and to make the L-shaped shutter release locking lever 38 disengaged from the engaging portion 4b of the shutter release member 4.

The magnetically operable L-shaped lever 40 is further engaged with a second shutter blade holding lever 41 which is pivotally mounted to a pivot 41a. The second shutter blade holding lever 41 has an engaging portion 41b at an end thereof engaged with a pin 42 fixed to the second shutter blade 34. The lever 41 is spring urged counterclockwise by means of a tension spring 41c so that the lever 41 may be disengaged from the pin 42 to let the second shutter blade 34 start when the magnetically operable L-shaped lever 40 is rotated clockwise upon deenergization of a magnet M. The magnetically operable lever 40 is rotatably mounted to a pivot 40a and rotated counterclockwise upon energization of the magnet M and rotated clockwise upon deenergization of the magnet M.

A first switch S1 is provided under the shutter release member 4 so that the switch S1 may be closed upon depression of the shutter release member 4. The second switch S2 and the third switch S3 are located under said left hand 36c of the first shutter blade holding lever 36 as mentioned hereinbefore. A fifth switch S5 is located in contact with the trailing end of the first shutter blade 33 so that the switch S5 may be opened upon start of the first shutter blade 33. The second and third switches S2 and S3 are changeover switches having three contacts O, N and W, respectively as shown in FIGS. 4 and 5 and are connected with a fourth switch S4.

The fourth switch S4 comprises a fixed contact 53 and a movable contact 54. The fixed contact 53 is connected with the contact W of the third switch S3 and the movable contact 54 is connected with the contact W of the second switch S2. The movable contact 54 is engaged with a cam 51 fixed to a shaft 50 of the shutter locking means nullifying lever 6. The shaft 50 of the nullifying lever 6 is provided with another cam 52 which is engaged with a self-timer start lever 56 pivotally mounted to a pivot 56a. The self-timer start lever 56 is engaged with a self-timer start pin 55 and is spring urged by a tension spring 56b in the direction to follow the cam 52 and move apart from the start pin 55 as shown in FIG. 4.

Figure 6A:
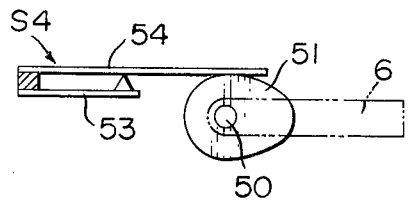
FIGS. 6A to 6D are fragmentary front views showing the operation of a shutter locking means nullifying lever employed in the present invention.
Figure 6B:
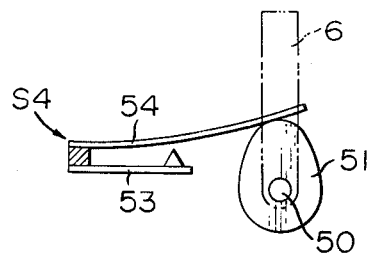
Figure 6C:
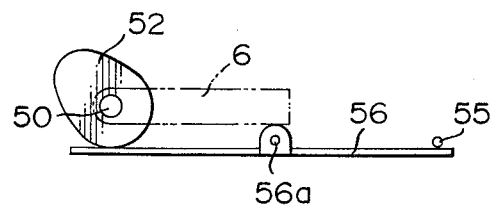
Figure 6D:
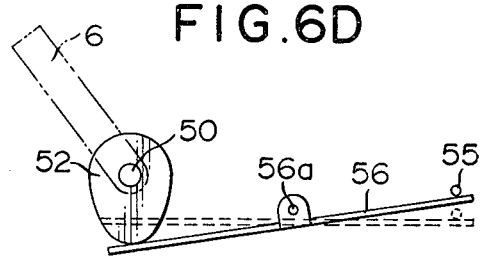

Referring to FIGS. 6A to 6D, the movable contact 54 of the fourth switch S4 is in contact with the fixed contact 53 when the shutter locking means nullifying lever 6 is in the normal position as shown in FIG. 6A. As the lever 6 is rotated counterclockwise to the nullifying position as shown in FIG. 6B, the movable contact 54 is separated from the fixed contact 53 to open the fourth switch S4. The cam 52 which is in engagement with the self-timer start lever 56 is in the non-operating position when the nullifying lever 6 is in the normal position as shown in FIG. 6C. When the lever 6 is rotated to said third position as shown in FIGS. 3 and 6D, the cam 52 moves the self-timer start lever 56 to operate the self-timer start pin 55 thereby.

The operation of the shutter mechanism 32 as described hereinabove will hereinbelow be described in detail in connection with a control circuit as shown in FIG. 5. The structure of the shutter control circuit will be described together with the description of operation thereof referring to FIG. 5.

When the shutter release member 4 is depressed, the first switch S1 is closed upon the first stage of depression thereof and the control circuit is supplied with electric current from a power source E. At this stage, the second and third switches S2 and S3 are on the W-side and the fourth and fifth switches S4 and S5 are closed as indicated with solid lines in FIG. 5. Under the condition as described above, the resistance of a photodetector Rx changes in accordance with the scene brightness sensed thereby and the potential at the point P1 between the photodetector Rx and a fixed resistor R4 changes therewith. By selecting the resistance of the fixed resistor R4 so that the operating point of a switching transistor Tr1 corresponds to the critical potential at the point P1 for the lower limit of scene brightness, the potential at the point P1 becomes higher than the operating point of the switching transistor Tr1 when the scene brightness is lower than the lower limit of the range wherein the picture of normal exposure can be obtained with a normal shutter speed and accordingly the transistor Tr1 is turned ON and another transistor Tr1 connected therewith is turned OFF. Therefore, the magnet M connected with the second transistor Tr2 is not energized.

When the magnet M is not energized, the shutter mechanism 32 operates as follows. The magnetically operable L-shaped lever 40 is not attracted by the magnet M, and accordingly, the second shutter blade holding lever 41 is in the position to release the pin 42 of the shutter blade 34 and the shutter blade 34 is in the state where it can be pulled to the right by the tension spring 44. The interlocking lever 39 is rotated counterclockwise by the spring 39c and allows the clockwise rotation of the L-shaped shutter release locking lever 38 caused by the spring 38d. Thus, the shutter release locking lever 38 is moved to a position where the engaging top end 38b thereof is brought into engagement with the engaging portion 4b of the shutter release member 4. Consequently, the shutter release member 4 is prevented from moving down to release shutter upon closure of the first switch S1 immediately after it is depressed.

When the scene brightness becomes high and the potential at the point P1 falls below the operating point of the switching transistor Tr1, which means that the scene brightness is sufficiently high to obtain a picture of normal exposure with a normal shutter speed, the transistor Tr1 is turned OFF and the other transistor Tr2 is turned ON, and accordingly, the magnet M is energized.

When the magnet M is in the energized condition, the shutter mechanism 32 operates as follows. The magnetically operable L-shaped lever 40 is attracted by the magnet M and rotated counterclockwise about the pivot 40a to swing the second shutter blade holding lever 41 and the interlocking lever 39 clockwise about the pivots 41a and 39a. By the clockwise swing of the holding lever 41, the pin 42 of the second shutter blade 34 is engaged with and held by the engaging portion 41b of the holding lever 41. The shutter release locking lever 38 is rotated counterclockwise by the clockwise swing of the interlocking lever 39 to release the shutter release member 4. Thus, the shutter release member 4 is made further depressible. When the shutter release member 4 is depressed deeply, the releasing portion 4c of the shutter release member 4 pushes the left hand 36c of the first shutter blade holding lever 36 downward at the final stage of depression thereof. By the depression of the shutter release member 4, therefore, the first shutter blade holding lever 36 is rotated counterclockwise to release the first shutter blade 33. Immediately before the shutter blade 33 starts, the second and third switches S2 and S3 are switched to the O-side to form a time constant circuit comprising a capacitor C and the photodetector Rx to control the shutter speed automatically in accordance with the scene brightness. Then, the first shutter blade 33 starts and moves to the right by the tension of the tension spring 43 and the opening 33a thereof falls in alignment with the optical axis A–B. Since the second shutter blade 34 is held in the start position by the holding lever 41, the opening 33a of the first shutter blade 33 is brought into alignment with the opening 34a of the second shutter blade 34 to expose the film 31 to the light from the taking lens 2. Simultaneously with the start of the first shutter blade 33, the fifth switch S5 is opened. When a time determined by the combination of the resistance of the photodetector Rx and the capacitor C has lapsed, which time corresponds to the exposure time, the transistor Tr1 is turned ON and the transistor Tr2 is turned OFF yo deenergize the magnet M. By the deenergization of the magnet M, the magnetically operable L-shaped lever 40 is released from the magnet M and rotated clockwise to make the holding lever 41 swing counterclockwise and release the second shutter blade 34. Thus, the second shutter blade 34 is moved to the right by the tension of the spring 44 and the opening 34a of the second shutter blade 34 is moved out of alignment with the opening 33a of the first shutter blade 33 to complete the exposure.

Even when the scene brightness is lower than said lower limit and the shutter release member 4 is prevented from being depressed to release the shutter, the shutter mechanism 32 is made operable to release shutter by rotating the shutter locking nullifying lever 6 in the counterclockwise direction as shown in FIGS. 3 and 6B. The shutter mechanism 32 operates as follows under this condition. Upon the counterclockwise rotation of the nullifying lever 6, the movable contact 54 of the fourth switch S4 is separated from the fixed contact 53 to open the switch S4. Consequently, the transistor Tr1 connected with the fourth switch S4 is turned OFF and the transistor Tr2 is turned ON to energize the magnet M. Upon energization of the magnet M, the shutter release locking lever 38 is rotated counterclockwise to allow the downward movement of the shutter release member 4. Therefore, it becomes possible to take a picture even if the scene brightness is lower than said limit.

In the above described first embodiment of the present invention, the shutter locking nullifying lever 6 is associated with a self-timer start lever 56 which is engaged with a self-timer start pin 55 so that the self-timer may be operated by rotating the lever 6 up to a position as shown in FIGS. 3 and 6D. Since the shutter mechanism 32 is put in the state wherein the shutter is releasable by the rotation of the nullifying lever 6, the self-timer is operated to release the shutter in the normal way.

Figure 7:
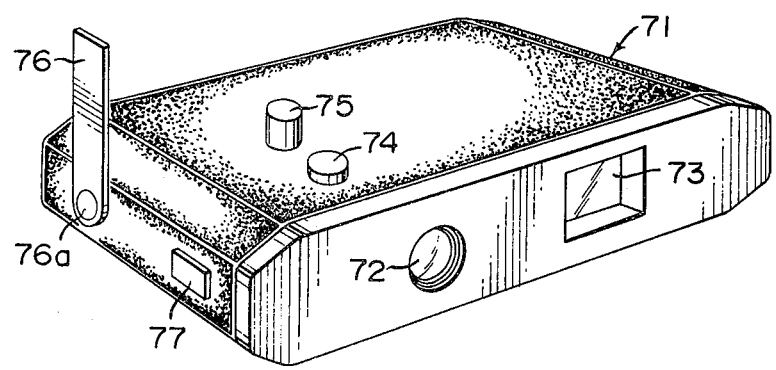
FIG. 7 is a perspective view of another embodiment of a camera in accordance with the present invention.

In the second embodiment, as shown in FIG. 7, a self-timer start button 77 is provided on the side face of a camera body 71. The camera body 71 is provided on the front face thereof with a taking lens 72 and a view finder window 73 and on the upper face thereof with a shutter release button 74 and a self-timer charge button 75. The side face of the camera body 71 is further provided with a shutter locking means nullifying lever 76 pivotally mounted to a pivot 76a. The nullifying lever 76 is swingable between two positions in one of which the lever 76 covers the self-timer start button 77 and in the other of which the lever 76 allows access to the start button 77. The position wherein the lever 76 covers the button 77 corresponds to the normal position of said lever 6 in the first embodiment wherein the shutter release locking means is in operation and the position wherein the lever 76 allows access to the button 77 corresponds to the nullifying position of said lever 6 in which the shutter release locking means is nullified. The nullifying lever 76 should preferably be click-stopped at the two positions. The nullifying position of the lever 76 should best be easily recognizable so that the photographer will be prevented from accidentally pushing the self-timer start button 77, since the self-timer is usually charged in this camera and must be prevented from being accidentally depressed.

I claim:
1. A photographic camera comprising,
    a camera body containing a shutter mechanism therein and having a shutter release button thereon to be depressed for operating said shutter mechanism,
    an automatic exposure control means provided in the camera body for controlling said shutter mechanism in accordance with the scene brightness measured thereby to obtain a photograph of normal exposure,
    a shutter release locking means provided in the camera body for locking said shutter mechanism to prevent the same from operating when the scene brightness is below a predetermined level,
    a self-timer provided in the camera body,
    a self-timer starting member provided in the camera body and operatively connected to said self-timer for starting the operation of the self-timer, and
    a shutter locking nullifying lever pivotally mounted on the camera body movable between a first position where the shutter release mechanism is capable of being locked by said shutter release locking means and a second position where the effect of the shutter release locking means is nullified,
    said self-timer starting member being capable of being operated when said shutter locking nullifying lever is in said second position.
2. A photographic camera as claimed in claim 1 wherein said self-timer is normally charged, and said self-timer starting member is prevented from being operated when said shutter locking nullifying lever is in said first position.
3. A photographic camera as claimed in claim 2 wherein said self-timer starting member is a depressible button and said shutter locking nullifying lever is swingable between said first and second positions and covers said depressible button for starting the self-timer to prevent the access thereto when said lever is in the first position.
4. A photographic camera as claimed in claim 1 wherein said self-timer starting member is located within the camera body and said shutter locking nullifying lever is operatively connected with the self-timer starting member, said self-timer starting member being capable of being operated by said shutter locking nullifying lever only when said lever is in said second position.
5. A photographic camera as claimed in claim 4 wherein said shutter locking nullifying lever is further swingable beyond said second position and said self-timer starting member is operated upon the further swing of said lever beyond said second position.
6. A photographic camera as claimed in claim 1 wherein said shutter release locking means comprises a locking lever movable between a first position wherein the locking lever is engaged with the shutter mechanism to lock and prevent the operation of the shutter mechanism and a second position wherein the locking lever is separated from the shutter mechanism, an electromagnet connected with said automatic exposure control means to be energized when the shutter release operation is initiated, interlocking means connected between said locking lever and said electromagnet for moving said locking lever from said first position to said second position thereof upon energization of said electromagnet, and a control circuit means comprising a light measuring circuit and an electromagnet energizing circuit connected with said electromagnet, said control circuit means deenergizing said electromagnet when the output of said light measuring circuit indicates that the scene brightness measured thereby is below a predetermined level.
7. A photographic camera as claimed in claim 6 wherein said control circuit means is provided with a switch operatively connected with said shutter locking nullifying lever, said switch nullifying the function of said control circuit means to deenergize said electromagnet when said switch is opened, said switch being opened by the movement of said shutter locking nullifying lever from said first position to said second position thereof.
8. A photographic camera as claimed in claim 7 wherein said switch comprises a fixed contact and a movable contact, and said shutter locking nullifying lever is provided with a cam engaged with said movable contact so that the movable contact may be separated from the fixed contact upon swing of the lever from said first position to said second position.

* * * * *